2,132,841

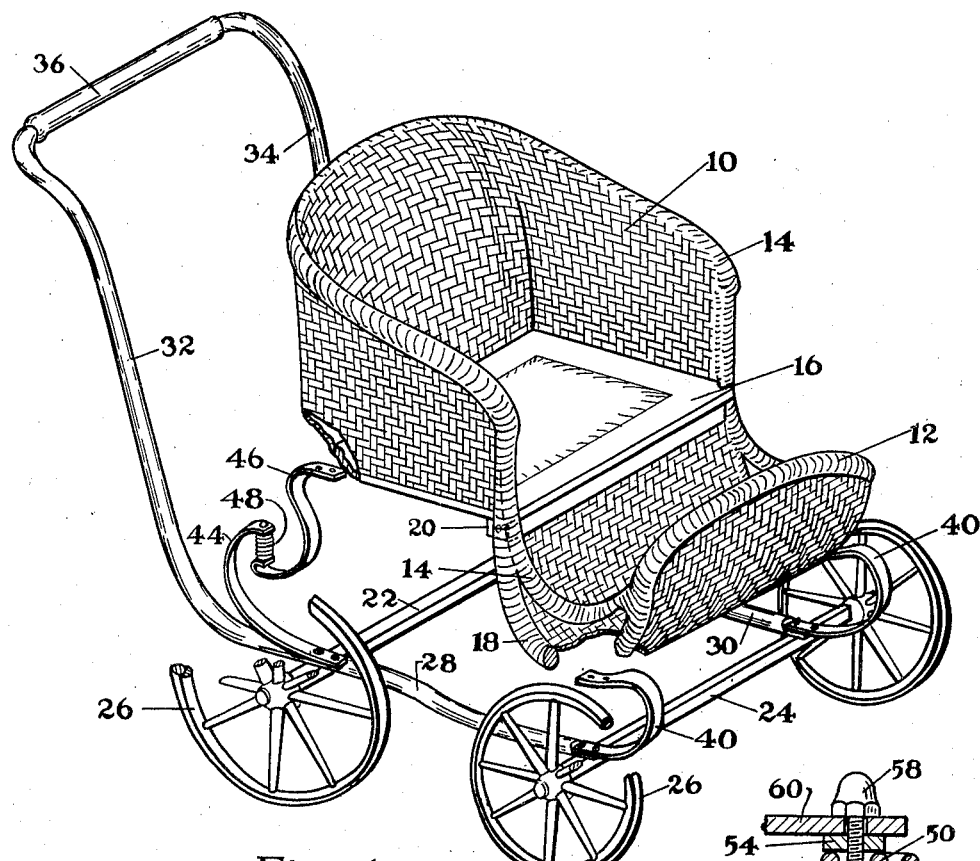
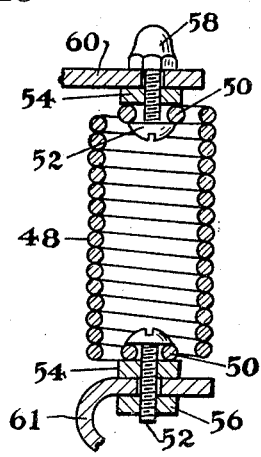
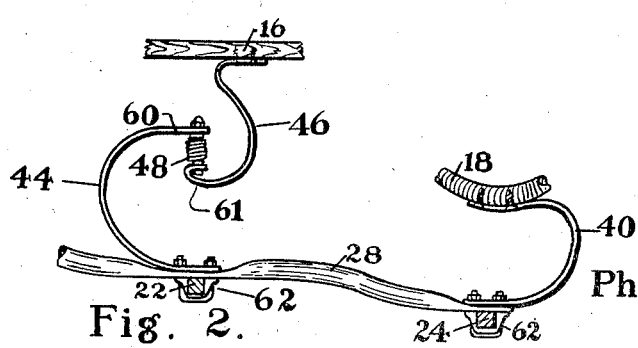
Oct. 11, 1938. P. T. BAUMGARTNER 2,132,841
SHOCK ABSORBING CHASSIS FOR A CHILD'S VEHICLE
Filed June 4, 1936
Fig. 1.
Fig. 2.
Fig. 3.
Inventor
Philip T. Baumgartner Patented Oct. 11, 1938

UNITED STATES PATENT OFFICE 2,132,841

SHOCK ABSORBING CHASSIS FOR A CHILD'S VEHICLE

Philip T. Baumgartner, Gardner, Mass.

Application June 4, 1936, Serial No. 83,531

4 Claims. (Cl. 267—5)

This invention relates to a shock absorbing chassis for a child's vehicle, and more particularly to a chassis which has a multiple spring arrangement intended to support the body of the vehicle resiliently and to absorb the shocks incident to the ordinary use thereof.

The standard baby carriage of the type herein described is customarily supported on two pairs of semi-elliptical or U-shaped members which have the appearance of and serve to a slight extent as springs. Owing, however, to the requirement that the carriage be able to carry widely varying weights, these supporting members must be made of strong material. Consequently, even if these members are sufficiently resilient to provide a comparatively easy ride for a very heavy child, yet a baby of light weight will be subjected to the shocks involved in wheeling the carriage over the ordinary sidewalks. Numerous types of springs have been employed in a chassis for such carriages, but these have presented various objectionable defects, such as permitting side sway of the carriage body or excessive movement thereof, or otherwise making the carriage uncomfortable for the child, or they have been so constructed as to require strengthening or redesigning the carriage body to accommodate the proposed type of spring.

It is the primary object of this invention to overcome these various difficulties and to provide a chassis for a child's vehicle which has spring devices so combined with the body supporting members as to furnish a comfortable ride for a child carried thereby and, in particular, to absorb the shocks incident to normal use thereof. Further objects will be apparent in the following disclosure.

In accordance with this invention, I have provided a child's vehicle, in which the body is supported by springs comprising a freely elongated coiled spring arranged substantially vertically, which is rigidly mounted at its upper end on a supporting member or arm carried by the wheeled support and rigidly secured at its lower end to an arm connected to carry the vehicle body, wherein the parts are so constructed and arranged that side swaying or lateral motion of the ends of the coiled spring and the body carried thereby is practically eliminated. In the preferred baby carriage construction, two coiled springs are secured rigidly between the free ends of two pairs of resilient springs, one of each being mounted on the chassis and the other supporting an end of the carriage body.

Referring to the drawing which illustrates one embodiment of this invention as applied to a baby carriage:

Fig. 1 is a perspective view with parts omitted or broken away which shows the relationship of the spring supporting chassis to the body and pusher and the wheels thereon;

Fig. 2 is a vertical elevation, with parts broken away, showing only one set of the front and rear springs mounted on the pusher side bar; and Fig. 3 is a sectional view through the suspension coil spring showing its manner of support.

The baby carriage body may be a single basket or unitary compartment for supporting a child or, as illustrated, it may comprise a seat portion 10 and a foot supporting portion 12 built together in a step-like arrangement and in various constructional designs. In the form shown in Fig. 1, the sides of the seat portion, which may be made of suitable material, such as woven fibre or rattan, are supported by wooden members 14 which are bent to the required shape as illustrated. These together with other structural features support the sides and secure them to the wooden bottom 16 forming the seat. Similarly, a bent wood piece 18 cooperates with the bent member 14 to support the woven material forming the foot support 12. The wooden cross piece 20 located at the front edge of the seat serves to space the ends of the side members 14 and 18, and to which it is suitably fastened by screws or bolts. Suitable upholstery and tufted cushions may be employed for making the carriage comfortable for a child.

The chassis comprises a wheeled support for the body and springs mounted thereon. The support includes axles 22 and 24 for the wheels 26 which may be of any suitable construction, and these two axles are held in proper relationship by means of the tubular side bars 28 and 30 which may form a continuation of the members 32 and 34 joined together by a cross piece 36 at their tops to form the pusher for the carriage. The construction as so far described may be suitably modified as desired and the above description is intended to be illustrative only of one type of carriage body and the chassis which may be employed in connection with this invention, but it will be understood that the chassis may be used with various other types of vehicles intended for use by children.

In order to support the carriage body resiliently on the side bars 28 and 30 or the wheeled support, I have provided a combination of leaf springs, which are substantially U-shaped, and tension coil springs as illustrated in the drawing. One set of springs 40, shown at the front of the carriage, may be semi-elliptical, flat members of suitable resilient metal which have sufficient strength for supporting an end of the carriage body and yet will bend as required to permit resilient motion thereof. These U-shaped springs 40 are suitably secured to the side bars 28 and 30, as by means of bolts or U-shaped clips 62 similar to those used for the rear support. They are also secured to the under side of the foot support 12 by means of screws or bolts passing into the wooden side pieces 18. It will be noted that these springs serve as continuations of the side bars 28 and 30 of the pusher frame and thus transmit the forward thrust from the pusher handle directly to the carriage body. These springs 40 are necessarily strong enough to carry the heaviest weight that may be required for the carriage.

Each of the rear springs which support the seat portion 10 of the carriage body comprises three members. One is a substantially U-shaped arm 44 made preferably of a flat leaf metal, which may have some resiliency. This arm is rigidly mounted on the wheeled support and serves in turn to carry suspended therefrom a second arm 46 of suitable shape which is adapted to be secured to the under side of the carriage body and to carry its weight. Interposed between the ends of these two arms 44 and 46 is a coil spring 48 which is so arranged as to suspend the arm 46 from the arm 44 and thus resiliently support the carriage body.

As illustrated particularly in Fig. 3, this coil spring 48 is made of highly resilient spring wire coiled tightly into a helical spring. This coiled wire has loops 50 formed at its opposite ends, and mounted within each of these loops is a short screw bolt 52, the inner head of which is within the helical spring while the shank passes through the loop 50 and outwardly for receiving a nut 54 thereon. For convenience of assembly, the coiled spring may be wound with the screw threaded shanks already in place and the heads located entirely within the coiled spring at the time that the coil is made. By setting the nuts 54 against the loop ends 50, the bolts will be held rigidly in position and thus serve as a continuation of the spring coil.

The arms 44 and 46 are so shaped and arranged that their ends 60 and 61 are spaced apart with the end 60 above the other by a sufficient distance for inserting the helical coil spring therebetween. As shown in Fig. 3, the nuts 56 and 58 serve to secure the bolt 52 at each end of the helical spring fixedly to the leaf members 44 and 46. It is desirable that these nuts 54 be clamped tightly against the ends 60 and 61 of the arms, so that the tension springs will be held rigidly in place thereon and thus transmit readily to the carriage body the forward thrust of the pusher during the normal movement of the carriage but not permit side sway of the coil spring.

The arms 44 have their lower ends bolted by a clip or bolts 62 to the hollow tubular rods 28 and 30 forming the sides of the carriage chassis. Similarly, the members 46 are secured by bolts or screws to the under side of the seat of the carriage body. Although the arms 44 and 46 may be substantially rigid, it is preferred that each have a U-shaped spring portion which aids in resiliently supporting the carriage body. Hence, the construction shown in the drawing is preferred. The upper end of the member 46 is turned forward in a substantially S-shape for convenience in fastening it to the carriage body, but it will be understood that various other arrangements may be employed for the purpose.

It is desirable that the two members 44 and 46 be so constructed and arranged that the upper end 60 of the arm 44 lie substantially above the lower end 61 of the member 46 or so located that the spring 48 will be used as a tension spring and not as a compression spring. If this arrangement were reversed so that the coil spring were used as a compression spring, then there would be an objectionable side sway to the carriage body because of the side bending of this spring. By suspending the coil spring in a substantially vertical position, the shocks incident to the chassis moving relative to the carriage body 10 are adequately absorbed. When the rear wheels 32 pass over a bump in the street, the end 60 of the spring 44 rises relative to the lower end 61 of the other spring, and thus serves to extend the shock absorbing spring. Similarly, any downward movement of the carriage tends to elongate the tension spring 48 and thus makes the carriage body easy riding. The forward springs 40 serve in the present construction to permit the seat portion of the body to ride up and down as the spring 48 is elongated and contracted, while taking some of the shock of the road themselves. It however is within the scope of my invention to employ the rear spring construction at the front as well as the rear, with suitable changes in shape and arrangement of the spring members 44 and 46, so as to fit in the narrower space under the foot support 12.

It will now be appreciated that the arms 44 and 46 may be made strong enough to support the carriage body and rigid enough to hold it from lateral side sway to any material extent and otherwise serve as have the semi-elliptical springs of the prior standard constructions. On the other hand, the coil springs 48 are made of comparatively light weight construction, and they are extremely resilient owing to their being formed as a coil; hence they are capable of permitting a shock absorbed movement of the carriage body. The coil spring will be stretched according to the load in the carriage, but owing to the nature of the spring, this load will be adequately supported on the suspension arm 60. Since the ends of the coil spring 48 are held rigidly on the arms 60 and 61, this shock absorbing spring will not permit side sway of the carriage body to any material extent, as might be the case if the ends of the spring were pivotally hung on the arms 60 and 61. This rigidity of construction is an important feature in this type of chassis mount. If the springs 48 were suspended by a pivot, such as by hooking their ends over the members 60 and 61, the constant motion would chafe and cut through the assembled parts and would, of course, cause the chassis to rattle and otherwise be objectionable. The present construction is rigid and does not permit any wear in the spring or any noise in the use of the vehicle.

It will also be noted that because of this particular arrangement of the springs, the motion of the seat portion 10 is substantially up and down, and the springs do not tend to bend or to break the body apart adjacent to the cross piece 20, as might be the case if the two springs tended to pull longitudinally on the body instead of merely to support it. In this particular, the spring suspension differs materially from the arrangement heretofore employed for supporting coach bodies on four suspension springs pivotally hung from the chassis frame, at angles to the vertical. Also, this type of spring construction is universal for various shapes and types of carriage bodies. If, for example, the seat 16 were arranged much higher above the bottom of the front portion 12 than shown, then it would be merely necessary to have the members 46 sufficiently longer to take care of this different arrangement. The other spring members 44 and 48, as well as the front springs, could be the same for all shapes and types of carriage supports. A further feature lies in the use of a short and comparatively stiff coil spring. A long flexible spring would permit the carriage body to sway laterally, whereas the spring 48 gives only sufficient side movement to make the carriage comfortable. The preferred spring has a length of about two inches and a diameter of about ⅞ inch, and it is made of ⅛ inch spring steel wire wound as a closed coil. Various other dimensions and shapes may however be employed, but it is desirable that this short and stiff wire spring have sufficient lateral rigidity so that it will not bend sideways easily. The chief motion should be that of longitudinal expansion and contraction of the coiled spring, while the lateral stiffness, together with the rigid fastenings at both ends thereof, will serve to center the vehicle body on the chassis and prevent material movement sideways.

Having thus described my invention, what I claim as new and desire to secure by Letters Patent is:

1. A child's vehicle comprising side bars mounted on wheels, a body, U-shaped springs supported on the side bars and connected to carry one end of the body, U-shaped, resilient suspension arms mounted on the side bars, a freely elongated coil spring suspended substantially vertically from and rigidly connected to each of said arms and a resilient arm rigidly connected to the coil spring and mounted on the other end of the carriage body.

2. A child's vehicle comprising a wheeled support, a body, a pair of U-shaped resilient arms fixed on the support, a freely elongated suspension coil spring depending substantially vertically from each arm, a further pair of resilient arms fixedly connected to the body and suspended from the coil springs and means which rigidly secures the coil springs to said arms, whereby the body is resiliently but steadily supported.

3. A child's vehicle comprising wheels and axles forming a wheeled support, a body, an arm secured on the end of the body and supporting the same, a freely elongated coiled spring projecting substantially vertically upward from the end of said arm, means connecting said arm rigidly with the lower end of the coiled spring, means rigidly connected to the upper end of the coiled spring and fixedly mounted on the wheeled support, and means for supporting the other end of the carriage body, said coiled spring being of sufficient lateral stability and so fastened at its ends as to prevent material lateral motion of the coil and permit a free substantially vertical elongation and contraction thereof during normal usage.

4. A child's vehicle comprising wheels and axles forming a wheeled support, a pusher thereon, a body, two arms extending from and rigidly secured to one end of the body, a freely elongated coiled spring secured rigidly at its lower end to each arm and projecting substantially vertically upward therefrom, a member rigidly connected to the upper end of each spring which is rigidly mounted on the wheeled support, and means for resiliently supporting the other end of the body, said spring being made with closed coils and with sufficient lateral stability and so arranged and fastened rigidly at its ends as to prevent material lateral side sway of the body but permit a free substantially vertical elongation and contraction of the spring during normal usage.

PHILIP T. BAUMGARTNER.